US010933701B2

(12) United States Patent
Benevelli et al.

(10) Patent No.: US 10,933,701 B2
(45) Date of Patent: Mar. 2, 2021

(54) VEHICLE WHEEL AND A METHOD FOR CONTROLLING A VEHICLE

(71) Applicant: CNH Industrial America LLC, New Holland, PA (US)

(72) Inventors: Alessandro Benevelli, Albinea (IT); Riccardo Morselli, San Vito di Spilamberto (IT)

(73) Assignee: CNH Industrial America LLC, New Holland, PA (US)

( * ) Notice: Subject to any disclaimer, the term of this patent is extended or adjusted under 35 U.S.C. 154(b) by 308 days.

(21) Appl. No.: 15/778,623

(22) PCT Filed: Nov. 22, 2016

(86) PCT No.: PCT/EP2016/078471
§ 371 (c)(1),
(2) Date: May 23, 2018

(87) PCT Pub. No.: WO2017/089358
PCT Pub. Date: Jun. 1, 2017

(65) Prior Publication Data
US 2018/0354317 A1 Dec. 13, 2018

(30) Foreign Application Priority Data
Nov. 23, 2015 (IT) .......................... UB2015A005809

(51) Int. Cl.
*B60C 23/00* (2006.01)
*B60C 23/04* (2006.01)
*B60Q 9/00* (2006.01)
*B60W 30/18* (2012.01)

(52) U.S. Cl.
CPC .......... *B60C 23/002* (2013.01); *B60C 23/003* (2013.01); *B60C 23/0408* (2013.01); *B60C 23/0486* (2013.01); *B60Q 9/00* (2013.01); *B60W 30/18* (2013.01)

(58) Field of Classification Search
CPC . B60C 23/002; B60C 23/003; B60C 23/0408; B60C 23/0486; B60Q 9/00; B60W 30/18
USPC ....................................................... 701/36
See application file for complete search history.

(56) References Cited

U.S. PATENT DOCUMENTS 6,826,951 B1 * 12/2004 Schuessler, Jr. ........ B60S 5/046
152/152.1
2007/0120658 A1 * 5/2007 Okubo ................ B60C 23/0433
340/445

FOREIGN PATENT DOCUMENTS

EP 1792757 6/2007
GB 2207954 2/1989

OTHER PUBLICATIONS

International Search Report and Written Opinion dated Feb. 3, 2017 for International Application No. PCT/EP2016/078471 (10 pages).

* cited by examiner

*Primary Examiner* — Muhammad Shafi
(74) *Attorney, Agent, or Firm* — Rickard K. DeMille; Rebecca L. Henkel

(57) ABSTRACT

A wheel for a vehicle includes a tyre and a rim for supporting the tyre. A chamber is defined between the tyre and the rim for receiving pressurized air. The wheel further includes a detecting device located inside the chamber for detecting presence of water in the wheel.

11 Claims, 2 Drawing Sheets

VEHICLE WHEEL AND A METHOD FOR CONTROLLING A VEHICLE

CROSS REFERENCE TO RELATED APPLICATIONS

This application is a US National Stage filing of International Application Serial No. PCT/EP2016/078471 entitled "A VEHICLE WHEEL AND A METHOD FOR CONTROLLING A VEHICLE," filed Nov. 22, 2016, which claims priority to Italian Application Serial No. UB2015A005809, filed Nov. 23, 2015, each of which is incorporated by reference herein in its entirety for all purposes.

The invention relates to a wheel for a vehicle, particularly an agricultural vehicle such as a tractor. The invention further relates to a method for controlling a vehicle on the basis of data that can be obtained from one or more sensors associated to a tyre of the vehicle.

Many farmers use to introduce water inside the wheels of a tractor, in order to increase weight of the tractor and hence improve adherence to the ground. This practice, which is forbidden by most legislations, may jeopardize safety of the vehicle, especially if the latter is travelling at a relatively high speed, as may be the case when the vehicle is advancing on a road.

Tyre inflation systems are being developed, which allow pressure inside the tyres to be regularly monitored, so that the tyres may be automatically inflated or deflated to ensure that tyre pressure is maintained within an optimal range. The tyre inflation systems does work properly if water is present inside the tyres, because water can flow into a pneumatic circuit of the tyre inflation system, the pneumatic circuit being arranged for inflating or deflating the tyres. If water penetrates inside the above mentioned pneumatic circuit, the tyre inflation system does no more work correctly and can even be damaged.

An object of the invention is to improve known vehicles, particularly agricultural vehicles such as tractors.

A further object is to increase safety of vehicles, for example agricultural vehicles such as tractors, particularly when travelling at a relatively high speed, as may occur on the roads.

Another object is to ensure proper functioning of a tyre inflation system of a vehicle, even if a driver is adopting non-allowed practices.

In a first aspect of the invention, there is provided a wheel for a vehicle, comprising a tyre and a rim for supporting the tyre, a chamber being defined between the tyre and the rim for receiving pressurized air, characterized in that the wheel further comprises a detecting device located inside the chamber for detecting presence of water in the wheel.

Owing to the detecting device, it is possible to detect whether water has been introduced inside the wheel, and more precisely in the chamber defined between the rim and the tyre. This allows appropriate measures to be taken in order to guarantee safety of the vehicle and proper functioning of the systems installed on the vehicle, such as systems for monitoring pressure inside the wheels and for automatically inflating or deflating the tyres when needed.

In an embodiment, the detecting device comprises a humidity sensor by means of which presence of water inside the wheel can be detected.

The humidity sensor allows a control unit of the vehicle to detect whether an operator has unduly introduced water in the chamber between the tyre and the rim.

In an embodiment, the detecting device comprises a pressure sensor for detecting pressure in the chamber defined between the tyre and the rim.

The detecting device may further comprise a temperature sensor for detecting temperature in the above mentioned chamber.

Hence, the same detecting device may be used both for determining whether water is present inside the wheel, as well as for detecting input data that are required by the system which monitors pressure inside the wheel, namely pressure and possibly temperature in the chamber.

In an embodiment, the detecting device is anchored to a surface of the rim delimiting the chamber.

The detecting device can thus be installed easily inside the wheel, even inside an existing wheel, without requiring changes in the shape or structure of the wheel.

In an embodiment, the detecting device is water proof.

The detecting device can thus work properly even if water is present inside the wheel.

In a second aspect of the invention, there is provided a method for controlling a vehicle, the method comprising the following steps:
  determining whether water is present inside a chamber defined between a tyre and a rim of a wheel of the vehicle;
  measuring pressure inside the chamber;
  if no water is present inside the chamber and if pressure measured inside the chamber is different from a target pressure value, activating a tyre inflation system for inflating or deflating the tyre in order to bring pressure inside the chamber at the target pressure value.

Owing to the second aspect of the invention, the tyre inflation system which automatically inflates or deflates the tyre to maintain pressure inside the chamber at a target value is activated not only when pressure inside the chamber is different from the target value, but also only if no water is detected inside the chamber. If water is detected inside the chamber, the tyre inflation system is not activated, even if the pressure measured inside the chamber is different from the target pressure. This prevents any water that is undesirably present inside the wheel from damaging the components of the tyre inflation system, such as pneumatic circuits included in the tyre inflation system. It is thus ensured that the tyre inflation system works in optimal conditions.

In an embodiment, the method further comprises the step of limiting the speed of the vehicle, if water is detected inside the chamber.

Safety of the vehicle can consequently be increased, because it is ensured that the speed of the vehicle does not overcome a preset threshold, if water has been introduced into the wheels.

The invention will be better understood and carried out with reference to the attached drawings that show an exemplifying and non limiting embodiment thereof, in which.

Figure 1:
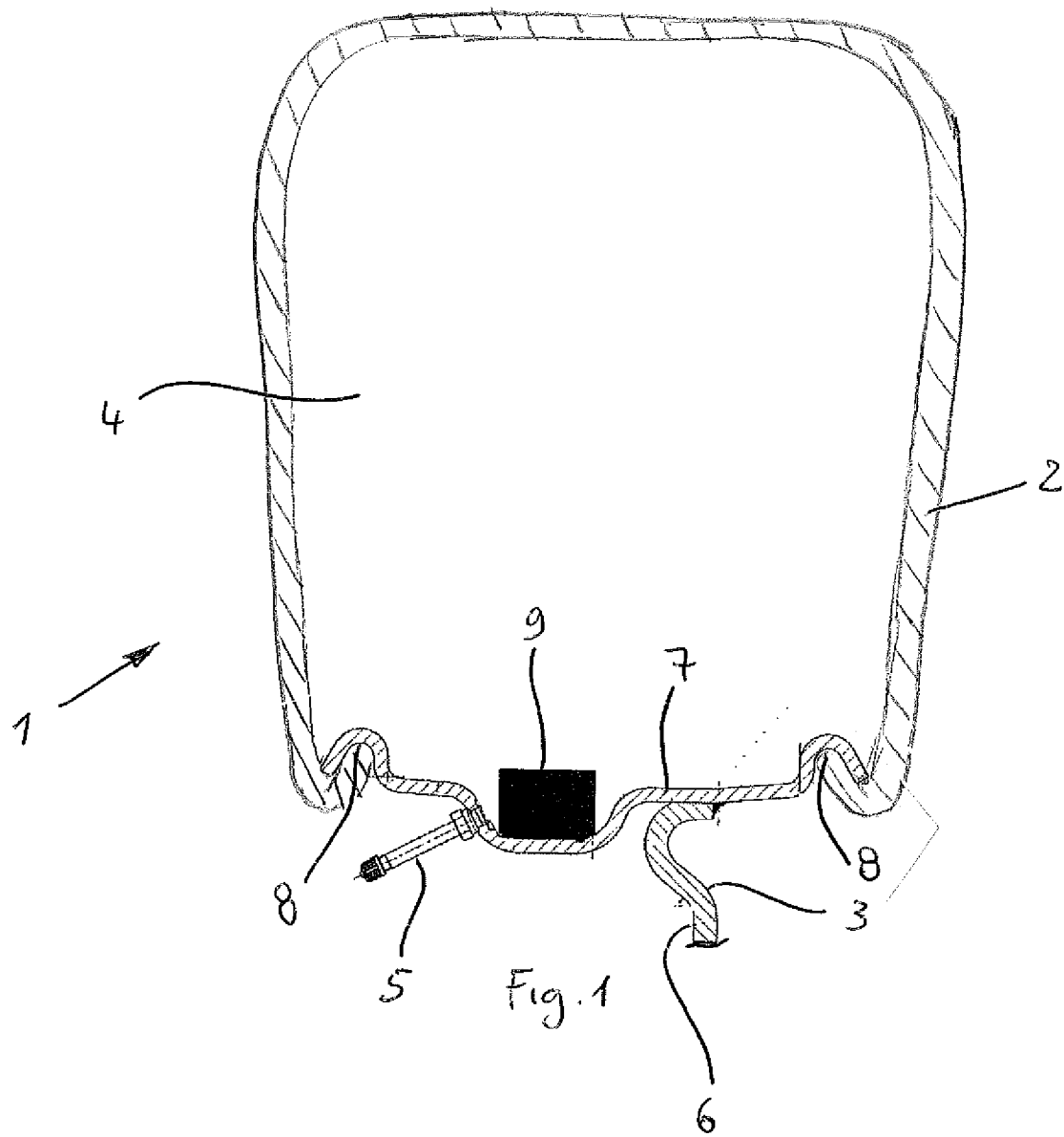
FIG. 1 is a schematic and interrupted cross section, showing a portion of a wheel of a vehicle.

FIG. 1 shows a portion of a wheel 1 of a vehicle, particularly an industrial or agricultural vehicle such as a tractor. The wheel 1 comprises a tyre 2 mounted on a rim 3. Inside the wheel 1, i.e. between the tyre 2 and the rim 3, a chamber 4 is defined. The chamber 4 is intended to receive pressurized air, which may be sent inside the chamber 4 through a valve 5 provided on the rim 3.

Air can be sent inside the chamber 4, and the tyre 2 can thus be inflated, either manually or automatically. In the latter case, a tyre inflation system (TIS) is provided on the vehicle for automatically sending pressurized air inside the chamber 4 so as to inflate the tyre 2. The tyre inflation system may further be configured to deflate the tyre 2 in case an excessive pressure is present inside the chamber 4.

A control unit is provided for controlling the tyre inflation system.

The rim 3 comprises a central portion 6, shown only partially in FIG. 1, which is intended to be fastened to a hub of the vehicle. The rim 3 further comprises a tyre supporting portion 7, suitable for engaging with the tyre 2 in order to support the latter. The tyre supporting portion 7 may comprise two end grooves 8, each one of which is intended to receive an edge of the tyre 2.

Inside the wheel 1, a detecting device 9 is provided, shown only schematically in FIG. 1. The detecting device 9 is housed inside the chamber 4. In particular, the detecting device 9 may be attached, e.g. by gluing, to a zone of the supporting portion 7 interposed between the end grooves 8, The detecting device 9 thus projects inside the chamber 4.

The detecting device 9 comprises a humidity sensor for detecting whether or not water is present inside the chamber 4. It may actually happen that the driver, in order to increase weight of the tractor and hence adherence thereof to the ground, introduces a certain quantity of water inside the wheel 1. The humidity sensor is capable of detecting whether this has occurred.

The detecting device 9 further comprises a pressure sensor for measuring air pressure inside the chamber 4. Furthermore, the detecting device 9 may comprise a temperature sensor for measuring temperature inside the chamber 4. The signals provided by the pressure sensor and the temperature sensor, which are indicative respectively of pressure and temperature measured inside the wheel 1, are intended to be processed by the tyre inflation system in order to determine whether and to which extent the tyre 2 has to be inflated or deflated by the tyre inflation system.

In order to work properly even if water has been introduced inside the wheel 1, the humidity sensor is water proof. The whole detecting device 9 may be water proof. For example, the humidity sensor, the pressure sensor and the temperature sensor may be housed inside a common water proof housing.

The detecting device 9 is configured to communicate with the control unit, for example via wireless means for communication. The wireless means for communication may comprise a wi-fi connection. Thus, the detecting device 9 is capable of transmitting to the control unit the values of humidity, pressure and temperature measured inside the chamber 4.

The control unit is capable of converting the signals received from the detecting device 9 into messages of a particular format, for example into CAN messages. The so converted messages can be shared on a vehicle CAN bus which receives and transmits information concerning the operation of the vehicle.

Figure 2:
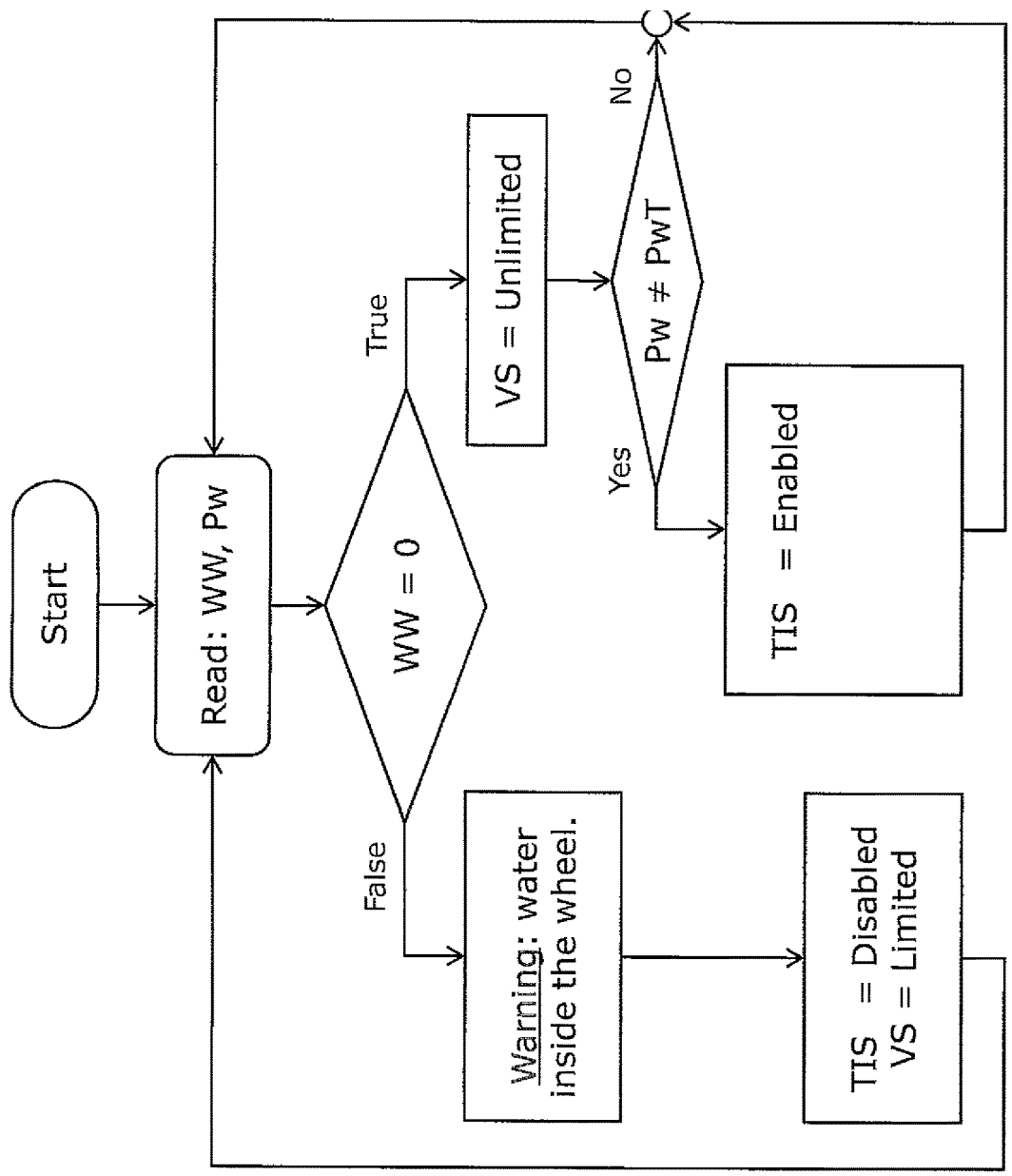
FIG. 2 is a flow chart showing the steps of a method for controlling a vehicle.

The detecting device 9 operates and is controlled according to the steps of the method shown in FIG. 2.

In a first step of the method, the control unit determines whether water is present in the chamber 4. To this end, a signal WW derived from the humidity sensor is read by the control unit. The signal WW may either be zero, which implies that no water is present inside the wheel 1, or have a value greater than zero, which means that water has been detected inside the wheel 1.

Furthermore, pressure is measured inside the wheel 1 by means of the pressure sensor included in the detecting device 9. Temperature inside the wheel 1 may further be measured by means of the temperature sensor.

A parameter Pw that is indicative of air pressure inside the wheel 1, which can be calculated by taking into consideration the signals received by both the pressure sensor and the temperature sensor, is read by the control unit.

If it is found that the condition WW=0 is not satisfied, than water is present inside the wheel 1.

In this case, the method may comprise the step of generating a warning message intended to warn the driver that water is present inside the wheel 1. The warning message can be displayed on a control panel of the vehicle.

Furthermore, if it is found that the condition WW=0 is not satisfied, the tyre inflation system is disabled. It is thus avoided that water inside the wheel 1 may jeopardize proper operation of the tyre inflation system, or damage components thereof.

The method shown in FIG. 2 also comprises the step of limiting the speed of the vehicle (VS) if it is found that WW☐0. In this case, the control unit acts in such a way that the speed of the vehicle cannot exceed a certain threshold. Safety for the driver is thus increased, because it is ensured that the vehicle cannot reach dangerous speeds if water is detected inside the wheel 1.

If, on the other hand, it is found that water is not present inside the wheel 1, i.e. the condition WW=0 is satisfied, then the control unit does not limit the vehicle speed. In this case, the vehicle can travel at any speed chosen by the driver, because no water inside the wheel 1 jeopardizes safety of the vehicle.

Furthermore, in case WW=0, the parameter Pw indicative of air pressure in the chamber 4 is compared with an air pressure target value PwT, i.e. a value of pressure inside the wheel 1 which is considered to be optimal.

If it is found that Pw☐PwT, then the tyre inflation system is activated to bring pressure inside the wheel at a value which is as close as possible to the target value PwT.

If on the other hand it is found that Pw=PwT, no action is taken, because pressure inside the wheel is already at an optimal value.

The invention claimed is:

1. A method for controlling tyre pressure in a wheel, the method comprising the following steps:
    detecting whether water is present inside a chamber defined between a tyre and a rim of the wheel;
    measuring pressure inside said chamber;
    if no water is present inside the chamber and if pressure (Pw) measured inside the chamber is different from a target pressure value (PwT), activating a tyre inflation system for inflating or deflating the tyre in order to bring pressure inside the chamber at the target pressure value (PwT); and
    setting a limit to vehicle speed if water is detected inside the chamber.

2. The method of claim 1, wherein the tyre inflation system is disabled if water is detected inside the chamber.

3. The method of claim 1, wherein presence of water inside the chamber is determined by means of a detecting device located in the chamber, the detecting device comprising a humidity sensor.

4. The method of claim 3, wherein the detecting device further comprises a pressure sensor for measuring pressure inside the chamber in order to monitor said pressure and activate the tyre inflation system, if needed.

5. The method of claim 3, wherein the detecting device further comprises a temperature sensor for detecting temperature inside the chamber.

6. A method for controlling tyre pressure in a wheel, the method comprising the following steps:
- detecting whether water is present inside a chamber defined between a tyre and a rim of the wheel;
- measuring pressure inside said chamber;
- if no water is present inside the chamber and if pressure (Pw) measured inside the chamber is different from a target pressure value (PwT), activating a tyre inflation system for inflating or deflating the tyre in order to bring pressure inside the chamber at the target pressure value (PwT),
- wherein a warning signal is generated if water is detected inside the chamber.

7. The method of claim 6, wherein the tyre inflation system is disabled if water is detected inside the chamber.

8. The method of claim 6, further comprising setting a limit to vehicle speed if water is detected inside the chamber.

9. The method of claim 6, wherein presence of water inside the chamber is determined by means of a detecting device located in the chamber, the detecting device comprising a humidity sensor.

10. The method of claim 9, wherein the detecting device further comprises a pressure sensor for measuring pressure inside the chamber in order to monitor said pressure and activate the tyre inflation system, if needed.

11. The method of claim 9, wherein the detecting device further comprises a temperature sensor for detecting temperature inside the chamber.

\* \* \* \* \*